Patented Nov. 11, 1952

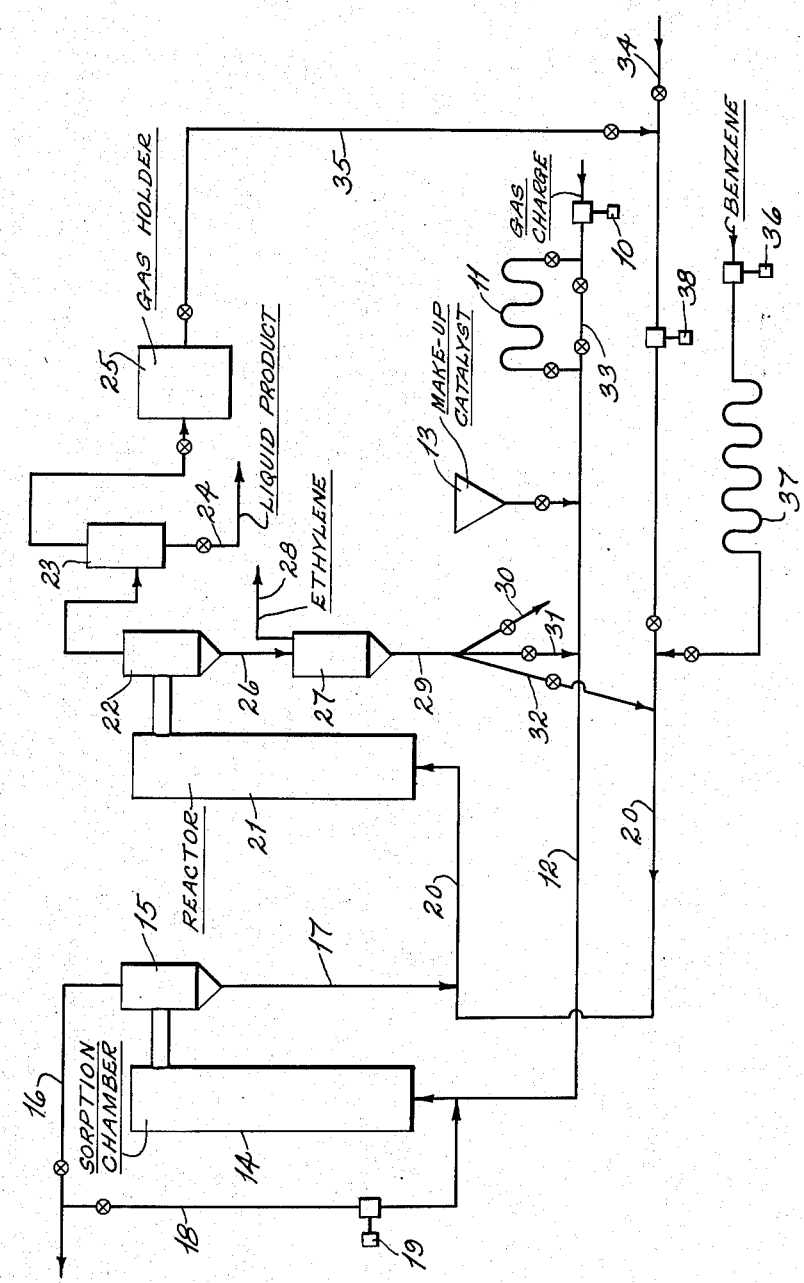

2,617,839

UNITED STATES PATENT OFFICE 2,617,839

RECOVERY AND UTILIZATION OF OLEFINS FROM GASES

Frank J. Moore, Wappingers Falls, and Howard V. Hess and Robert K. Gould, Beacon, N. Y., assignors to The Texas Company, New York, N. Y., a corporation of Delaware Application August 14, 1950, Serial No. 179,278

4 Claims. (Cl. 260—671)

This invention relates to the recovery of olefins from dry gases and the treatment of the recovered olefins. The invention is directed particularly to the recovery of olefins from oil refinery gases and the conversion of the olefins into various products.

In accordance with the invention gases containing olefins are contacted with solid comminuted catalyst capable of forming compounds with the olefins so that the olefins are selectively removed from the gases and sorbed on the catalyst. The contacting is conducted under fluidized conditions and the catalyst containing the reacted or sorbed olefins is conveyed to a succeeding reaction zone for catalytic treating in contact with the catalyst. The catalyst thus serves as a means for the selective removal of the olefins from the gases and also as a means for catalyzing reactions with the olefins or olefin compounds contained on the catalyst.

In the practice of the invention refinery gases containing paraffin hydrocarbons and olefin hydrocarbons, such as ethylene and propylene, are contacted with catalysts such as phosphoric acid polymerization catalyst or silica-alumina cracking catalyst under fluidized conditions. The temperature of contacting is held below a temperature of polymerization or cracking and at a moderate temperature under which the olefins are selectively removed from the gases and sorbed on the catalyst as esters. The catalyst containing the esters is separated from the remaining gases and passed to a subsequent reaction zone in which the conditions are altered so that the esters are decomposed and the olefins subjected to reactions such as polymerization, aromatic alkylation or other reactions.

For the purpose of more fully describing the invention reference is had to the accompanying drawing which is a flow diagram illustrating a preferred embodiment of the invention.

Referring now to the drawing, a charging stock containing paraffinic and olefinic gases of which the olefinic content consists essentially of ethylene and propylene is directed by a pump 10 through a heating coil 11 wherein the gases are moderately heated. The heated gas stream passes through line 12 and fluidizes make-up catalyst received from a hopper 13. The fluidized stream is directed to a sorption chamber 14 wherein the contacting of the catalyst and gases is continued under the fluidized conditions. The temperature is maintained below a temperature of active polymerization and ethylene and propylene are sorbed on the catalyst with formation of ethyl and propyl esters. Substantially all of the propylene and a portion of the ethylene are removed from the gases and sorbed on the catalyst. The gases are separated from the catalyst in a trap or separator 15. The unsorbed gases are removed through a line 16 while the catalyst containing the sorbed or occluded esters descends through a standpipe 17. In practice it is generally desirable to recycle a portion of the effluent gases through the sorption chamber which is accomplished by withdrawing gas from the line 16 through a line 18 and directing it by pump or blower 19 back to the chamber 14.

The catalyst containing the esters is drawn from the standpipe 17 by a fluidizing medium flowing through line 20 and the fluidized stream is directed to a reaction chamber 21. The temperature of the fluidized stream is increased to a temperature at which the propylene esters are decomposed and the propylene subjected to polymerization. The solid catalyst is separated from the fluid reaction products in a trap or separator 22. The fluid reaction products which include the fluidizing medium, ethylene and any unreacted propylene, as well as the liquid polymer products of reaction, pass overhead to a separator 23 wherein the gaseous components are separated from the liquid polymer products. The polymers which consist essentially of products boiling in the gasoline boiling range are withdrawn through line 24. The gases pass overhead to a gas holder 25.

The catalyst separated in the trap 22 contains ethyl esters since these esters will not be decomposed on the usual polymerization catalysts under the conditions for the polymerization of propylene. The catalyst containing the ethylene esters descends from the cyclone 22 through a standpipe 26 to a heating chamber 27. The chamber 27 is heated by any suitable means so as to raise the temperature sufficiently to decompose the ethylene esters and effect the release of ethylene from the catalyst. The ethylene gases are removed through a line 28. The catalyst from which the ethyl esters have been removed descends through a standpipe 29 from which the catalyst is selectively withdrawn through branch lines 30, 31 and 32. Line 30 provides for the removal of catalyst from the system. Catalyst withdrawn through line 31 is fluidized by the gas charge flowing through line 12 to the sorption chamber 14 so that after operating conditions have been established the hot recycle catalyst is utilized for heating the gas charge to the sorption chamber and make-up catalyst from hopper 13 is added as needed. When sufficient heat is obtained from the hot recycle catalyst the heating coil 11 may be largely dispensed with and the gas charge routed directly through a bypass line 33.

The fluidizing medium employed in line 20 for charging the catalyst from the sorption chamber to the reactor 21 is directed by a pump or blower 38. This medium may be an extraneous gas drawn through line 34 or may be recycle gas drawn from the gas holder 25 through line 35. This gas stream withdraws hot catalyst from line 32 and fluidizes it to thus increase the temperature of the catalyst withdrawn from standpipe 17 and directed to the reactor 21.

In operating with a phosphoric acid polymerization catalyst the temperature in the sorption chamber 14 should be held under 300° F.; temperatures around 200° F. are recommended. At such temperatures there is substantially no polymerization of ethylene or propylene but the desired esterification takes place with the resultant selective sorption of the olefins from the mixed gases. The sorption chamber is preferably operated at such a rate that essentially all of the olefin in the dry gas will form esters with the free phosphoric acid in the catalyst while the catalyst is present in such an amount that not all of the free acid present is converted to esters. A satisfactory method of accomplishing such operation is to recycle a portion of the overhead gas from the sorption chamber by means of the pump or compressor 19. The temperature in the reactor 21 is raised to an active polymerization temperature in the presence of the catalyst, such as 300° F. to 500° F. under a wide range of pressure from atmospheric up to high pressures such as 300 to 1,000 pounds pressure. The preferred range of temperature with this catalyst is 425° F. to 450° F. Under these conditions the propylene esters are decomposed and the propylene is polymerized but there will be little or no polymerization of the ethylene. The pressure in the sorption step is not particularly critical; a satisfactory operation is to maintain in the sorption chamber pressures of somewhat the same order as are employed in the reactor. The temperature needed in chamber 27 to effect desorption and release of ethylene varies with the pressure but temperatures approximating 600° F. under moderate pressures, such as about 250 pounds, are adequate. It is advantageous to introduce a small quantity of water into the chamber 27 to offset any tendency toward dehydration of the catalyst.

When using a cracking type catalyst such as synthetic silica-alumina, somewhat higher temperatures may be carried in the sorption chamber such as about 300 to 400° F. Temperatures of 500 to 650° F. are suitable for this type of catalyst to effect decomposition of propylene esters and active polymerization of propylene. The pressures may vary from atmospheric to 500 pounds, the higher pressures being preferred since the lower pressures tend to give excessive hydrogen transfer and increased gaseous product yield. These conditions are satisfactory for the production of propylene polymer boiling essentially in the gasoline boiling range.

In an example of aromatic alkylation benzene is charged by a pump 36 through a heating coil 37 wherein the benzene is vaporized and preheated. The benzene vapors are directed through line 20 and fluidize recycle catalyst from line 32. A gas charge containing paraffinic and olefinic gases, of which the olefinic content consists essentially of ethylene and propylene, is directed by the pump 10 through line 12 and fluidizes fresh phosphoric acid polymerization catalyst from charge hopper 13. The fluidized stream passes to the sorption chamber 14 and the olefins are selectively sorbed as esters on the catalyst. The catalyst containing the esters is separated out in trap 15 and descending through line 17 is then fluidized by the benzene stream and directed to the reactor 21 to effect alkylation of the benzene. A satisfactory olefin feed rate is 0.033 gallon per lb. of catalyst per hour with a benzene to propylene ratio of 3:1. Temperatures of approximately 525° F. will generally give the maximum olefin conversion. The alkylate is separated in separator 23 and withdrawn through line 24.

The temperature-pressure conditions given herein for the several reactions, such as polymerization and benzene alkylation, are given by way of example. These reactions per se are known in the art and the conditions maintained for these several reactions may be varied to obtain the products desired. In general, however, the bringing of the olefin feed to the zone of reaction in the form of esters on the catalyst enables a satisfactory operation at lower pressures than in a conventional operation. In practicing our process the conditions in the sorption stage are so maintained that the action therein is limited to that of formation of esters or selective sorption of olefins from the mixed gases and the conditions are then altered in the succeeding reaction stage to effect the desired reaction with the olefin carried by the catalyst.

The gas charge containing ethylene and propylene which is directed to the sorption chamber 14 should be substantially free from butylenes or higher olefins so as to avoid a tendency to produce polymer in the sorption stage. The fluidizing medium which is utilized for fluidizing the ester-containing catalyst withdrawn from the cyclone 15 and directed to the reactor 21 may be composed of an inert gaseous medium introduced to the system through line 34 or of recycle gas from the gas holder 25 which will include any unreacted ethylene and propylene, or it may be composed of mixtures of such gases.

In a modification of the invention $C_3$ or $C_3$—$C_4$ cracked gases may be introduced through line 34 as the fluidizing medium. The presence of $C_4$ olefins in the charge to the sorption step would be disadvantageous, as has been stated, but on the other hand, the presence of $C_4$ olefins in the charge to the polymerization step in reactor 21 is advantageous since the presence of $C_4$ olefins serves to increase the propylene polymerization. Moreover, the polymerization of the $C_3$ or $C_3$—$C_4$ olefins which are added to the charge to the reaction chamber 21 operates to furnish heat for the reaction of the sorbed olefins contained on the catalyst which is conducted from the sorption stage.

Although our process is adapted for the recovery of olefins from mixed gases containing various proportions of olefins, it is particularly adapted for the treatment of refining gases containing relatively small proportions of olefins such as less than 25 per cent so as to utilize the propylene in the production of useful liquid products and at the same time recover substantially pure ethylene.

Although a preferred embodiment of the invention has been described herein, it will be understood that various changes and modifications may be made therein, while securing to a greater or less extent some or all of the benefits of the invention, without departing from the spirit and scope thereof.

We claim:

1. The process of recovering and utilizing olefins from mixed paraffinic and olefinic gases of which the olefin content consists essentially of ethylene and propylene that comprises fluidizing with such mixed paraffinic and olefinic gases a solid comminuted catalyst having an active acid surface and selected from the group consisting of solid phosphoric acid catalyst and silica-alumina cracking catalyst at a temperature sufficient to effect selective sorption on the catalyst of ethylene and propylene as ethyl and propyl esters but below a temperature at which polymerization of said olefins would occur, separating the unsorbed gases from the catalyst containing the sorbed olefin esters, fluidizing the latter catalyst in a fluidizing medium and subjecting the fluidized stream to an increased temperature sufficient to effect decomposition of the sorbed propyl esters and subject the resultant propylene to catalytic reaction but at a temperature insufficient to effect decomposition of the ethyl esters, separating the catalyst containing the ethyl esters and subjecting it to an increased temperature to effect decomposition of the ethyl esters and release of ethylene.

2. The process of recovering and utilizing olefins from mixed paraffinic and olefinic gases of which the olefin content consists essentially of ethylene and propylene that comprises fluidizing with such mixed paraffinic and olefinic gases a solid comminuted catalyst having an active acid surface and selected from the group consisting of solid phosphoric acid catalyst and silica-alumina cracking catalyst at a temperature sufficient to effect selective sorption on the catalyst of ethylene and propylene as ethyl and propyl esters but below a temperature at which polymerization of said olefins would occur, separating the unsorbed gases from the catalyst containing the sorbed olefin esters, fluidizing the latter catalyst in a gaseous medium and subjecting the fluidized stream to an increased temperature sufficient to effect decomposition of the sorbed propyl esters and polymerization of the resultant propylene but at a temperature insufficient to effect decomposition of the ethyl esters, separating the catalyst containing the ethyl esters and subjecting it to an increased temperature to effect decomposition of the ethyl esters and release of ethylene.

3. The process of recovering and utilizing olefins from mixed paraffinic and olefinic gases of which the olefin content consists essentially of ethylene and propylene that comprises fluidizing with such mixed paraffinic and olefinic gases a solid comminuted catalyst having an active acid surface and selected from the group consisting of solid phosphoric acid catalyst and silica-alumina cracking catalyst at a temperature sufficient to effect selective sorption on the catalyst of ethylene and propylene as ethyl and propyl esters but below a temperature at which polymerization of said olefins would occur, separating the unsorbed gases from the catalyst containing the sorbed olefin esters, fluidizing the latter catalyst in a stream of gases containing $C_3$ and $C_4$ olefins and subjecting the fluidized stream to an increased temperature sufficient to effect decomposition of the sorbed propyl esters and polymerization of the released propylene and of said $C_3$ and $C_4$ olefins but at a temperature insufficient to effect decomposition of the ethyl esters, separating the catalyst containing the ethyl esters and subjecting it to an increased temperature to effect decomposition of the ethyl esters and release of ethylene.

4. The process of recovering and utilizing olefins from mixed paraffinic and olefinic gases of which the olefin content consists essentially of ethylene and propylene that comprises fluidizing with such mixed paraffinic and olefinic gases a solid comminuted catalyst having an active acid surface and selected from the group consisting of solid phosphoric acid catalyst and silica-alumina cracking catalyst at a temperature sufficient to effect selective sorption on the catalyst of ethylene and propylene as ethyl and propyl esters but below a temperature at which polymerization of said olefins would occur, separating the unsorbed gases from the catalyst containing the sorbed olefin esters, fluidizing the latter catalyst in a stream of benzene vapors and subjecting the fluidized stream to an increased temperature sufficient to effect decomposition of the sorbed propyl esters and alkylation of the benzene with the resultant propylene but at a temperature insufficient to effect decomposition of the ethyl esters, separating the catalyst containing the ethyl esters and subjecting it to an increased temperature to effect decomposition of the ethyl esters and release of ethylene.

FRANK J. MOORE.
HOWARD V. HESS.
ROBERT K. GOULD.

REFERENCES CITED

The following references are of record in the file of this patent:

UNITED STATES PATENTS

| Number | Name | Date |
|---|---|---|
| 2,018,065 | Ipatieff | Oct. 22, 1935 |
| 2,062,312 | Ipatieff | Dec. 1, 1936 |
| 2,384,311 | Kearby | Sept. 4, 1945 |
| 2,437,828 | Lyons et al. | Mar. 16, 1948 |
| 2,456,435 | Matuszak | Dec. 14, 1948 |
| 2,488,190 | Hepp | Nov. 15, 1949 |